United States Patent
Au et al.

(10) Patent No.: US 6,490,376 B1
(45) Date of Patent: Dec. 3, 2002

(54) SKEW PROCESSING OF RASTER SCAN IMAGES

(75) Inventors: Ka Man Au, Philadelphia, PA (US); Zaioxun Zhu, Philadelphia, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/157,156

(22) Filed: Sep. 17, 1998

(51) Int. Cl.[7] ................................................ G06K 9/36
(52) U.S. Cl. ...................................... 382/290; 382/281
(58) Field of Search ................................ 382/289, 235, 382/245–290, 281; 235/462, 470, 472

(56) References Cited

U.S. PATENT DOCUMENTS

| | | |
|---|---|---|
| 3,868,634 A | 2/1975 | Dolch |
| 4,691,367 A | 9/1987 | Wevelsiep |
| 4,783,834 A | 11/1988 | Anderson et al. |
| 4,792,981 A | 12/1988 | Cahill, III et al. |
| 4,866,784 A | 9/1989 | Barski |
| 4,878,124 A | 10/1989 | Tsujimoto et al. |
| 5,414,250 A | 5/1995 | Swartz et al. |
| 5,446,271 A | 8/1995 | Cherry et al. |
| 5,504,316 A | 4/1996 | Bridgelall et al. |
| 5,506,918 A | * 4/1996 | Ishitani ........................ 382/289 |
| 5,523,552 A | 6/1996 | Shellhammer et al. |
| 5,581,635 A | 12/1996 | Zhu et al. |
| 5,635,699 A | 6/1997 | Cherry et al. |
| 5,637,851 A | 6/1997 | Swartz et al. |
| 5,770,841 A | * 6/1998 | Moed et al. ................. 235/375 |
| 5,854,854 A | * 12/1998 | Cullen et al. ................ 382/396 |

OTHER PUBLICATIONS

Hinds et al., "A document skew detection method using run–length encoding and the Hough transform," Jun. 16–21, 1990 Proceedings, 10th International Conference on Pattern Recognition, 1990 pp. 464–468.

"Automated Page Orientation and Skew Angle Detection for Binary Document Images", D..X. Le, G. Thoma, H. Weschler, Pattern Recognition, vol. 27, No. 10, pp. 1325–1344, Oct. 1994.

"Skew and Slant Correction for Document Images Using Gradient Direction", Changming Sun and Deyi Si, Fourth International Conference on Document Analysis and Recognition, Ulm, Germany, Aug. 18–20, 1997.

"A Robust and Fast Skew Detection Algorithm for Generic Documents", Bin Yu and Anil K. Jain, Department of Computer Science, Michigan State University, East Lansing, MI.48824–1027.

"Skew Angle Detection Using Texture Direction Analysis", Jaakko Sauvola and Matti Pietikainen, Computer Laboratory, Department of Electrical Engineering, University of Oulu, Oulu, Finland.

Handbook of Image Processing Operators, Reinhard Klette and Piero Zamperoni, John Wiley & Sons.

Hinds et al. A document skew detection method using run–length encodign and the Hough transform, Proc. 10th International Conference on Pattern Recognition, 1990, vol. 1, pp 464–468.*

* cited by examiner

*Primary Examiner*—Jingge Wu
(74) *Attorney, Agent, or Firm*—Lerner, David, Littenberg, Krumholz & Mentlik, LLP

(57) ABSTRACT

Run length encoded data derived from a raster scanner at an arbitrary angle to the horizontal direction of a rectilinear symbol such as a two-dimensional PDF code is examined to detect the skew angle between the horizontal direction of the symbol and the horizontal direction of the raster. Using the detected skew angle, a computer generates a set of virtual scan lines overlaid on the real scan lines. The computer partitions the virtual scan lines and the real scan lines into associated real and virtual line segments having common intersection points. The locations of mark to space or space to mark transitions are mapped from the real line segments onto the virtual line segments. The system can handle run length encoded data with low computational overhead.

32 Claims, 7 Drawing Sheets

SKEW PROCESSING OF RASTER SCAN IMAGES

BACKGROUND OF THE INVENTION

The present invention relates to processing of raster scan images, and more particularly relates to processing of raster scan images of rectilinear symbols such as PDF symbols or bar code symbols.

Optical scanners are widely used for reading data included by symbols on various items. One common application of optical scanning is in reading of bar code symbols such as Universal Product Code ("UPC") symbols. These scanners typically operate by directing a beam of light from a source such as a laser onto the object bearing the symbol and detecting the intensity of the reflected light. The scanner typically incorporate optical elements which focus the beam of light to a relatively small spot at the object bearing the symbol and can move the optical elements so as to sweep the spot of light across the object in a series of parallel lines referred to as "raster". These scanners also include a photodetector such as a photodiode or phototransistor which receives the light reflected from the object. As the spot of light moves over the object and encounters light and dark areas on the surface of the object, the amount of light reflected to the photodetector varies and the electrical signal produced by the photodetector varies correspondingly. These variations in the electrical signal from the photodetector typically are converted into digital signals having a first value, (e.g., 0) when the spot of light is focused on a point having high reflectivity and having a second, different value (e.g., 1) when the spot is focused on a point having low reflectivity. Thus, the scanner produces a series of digital values representing the reflectivity of the object at a series of points along each of the lines in the raster. Other scanners use different physical elements to provide a similar series of values for reflectivity along raster scan lines.

This data is then converted into information which represents the data encoded by the symbol using a computer programmed to recognize certain patterns in the data as representing certain information encoded by the symbol. The pattern recognition problem is complicated by the fact that the raster used to scan the symbol may lie at an arbitrary orientation with respect to the horizontal and vertical directions of the symbol. For example, a conventional one-dimensional bar code symbol 10 (FIG. 1) has a horizontal direction denoted by $X_s$ and a vertical direction denoted by the arrow $Y_s$. The symbol includes a series of vertical dark and light bars. The information carried by the symbol is encoded in the widths of these bars. For example, a dark bar 12 one unit wide followed by a light bar 14 one unit wide and a dark bar 16 three units wide may denote a numeral "3" whereas other sets of bars having different widths may denote other characters. If the symbol is scanned using a raster having scan lines 18 perfectly parallel to the horizontal direction of the symbol, the widths of the various bars will appear in the data as the lengths of series of ones and zeros representing light and dark areas. For example, bar 12 may appear as a series of 10 ones; light bar 14 may appear as a series of 10 zeros and dark bar 16 may appear as a series of 30 ones in succession. The other bars constituting the symbol will be represented in the same manner. If the horizontal or line direction of the raster is drastically misaligned with the horizontal direction of the symbol, the symbol cannot be read. For example, none of the scanning lines in raster 20 intercepts all of the bars in the symbol. However, if the horizontal direction of the raster is only slightly misaligned with the symbol, the symbol can still be read. For example, scan line 22a of raster 22 will intercept all of the bars in the symbol. Thus, the data representing the light and dark regions encountered along line 22a still includes the same series of light and dark regions which would be encountered along perfectly aligned scan line 18. The bars will still be represented by series of ones and zeros and the lengths of these series will still be proportional to the widths of the bar. For example, bar 12 may be represented as a series of 12 ones; light space 14 may appear as a series of 12 zeros and bar 16 may appear as a series of 36 ones. Although the absolute lengths of these series differ from the lengths which would be recorded for a perfectly aligned raster, the proportions of these series relative to one another do not change. Therefore, the computer can accurately decode the symbol based on the data acquired using raster 22. Typical scanners used for decoding one-dimensional bar codes gather data using rasters arranged at a few different dispositions as, for example, three rasters having their respective horizontal directions at 60 degree angles to one another. One of these rasters will have its horizontal direction aligned well enough with the horizontal direction of the symbol to provide meaningful data. The system discards the useless data generated by the other rasters.

There is a growing trend towards the use of two-dimensional symbols which include plural horizontal rows of light and dark regions. For example, the symbol 25 depicted in FIG. 2 is a PDF417 symbol having a horizontal direction $X_s$ and a vertical direction $Y_s$, and having nine horizontal rows 27 of light and dark areas. Each horizontal row of light and dark areas includes different information. Such a symbol can carry more information in a given space than a one-dimensional bar code. However, alignment of the horizontal direction of the raster with the horizontal direction of the symbol is far more critical in the case of a two-dimensional code. Thus, where the raster is perfectly aligned with the symbol, it will include at least one scanning line aligned with each horizontal row 27 of the symbol. For example, raster line 26a extends through the topmost row 27a areas in symbol 24, but does not extend through any other row of the symbol. Similarly, line 26b of the same raster extends through the second row 27b of the symbol and so on. Line 28a of a misaligned raster, which is skewed with respect to the symbol, will not include the same pattern of light and dark areas as any of the perfectly aligned scan lines 26. To provide meaningful information from a two-dimensional symbol, a raster must be have its horizontal direction aligned to within a few degrees with the horizontal direction of the symbol. To read a two-dimensional symbol presented at a random orientation using the trial-and-error approach used with one-dimensional symbols, the system would have to generate scores of rasters, and try to decipher data from all of these rasters, in order to be sure of obtaining data from one raster having its horizontal direction aligned well enough with the horizontal direction of the symbol. This typically is not practical.

As described, for example, in Shellhammer et al., U.S. Pat. No. 5,523,552, it has been proposed to scan a two-dimensional rectilinear symbol such as a PDF symbol using a plurality of rasters disposed at different known dispositions. The system calculates the skew angle between the vertical direction of each raster and the vertical direction of the symbol based upon the data found in each scan. From these skew angles, the system determines the disposition of the symbol in the frame of reference of the scanner apparatus. The system then generates a raster having its horizontal direction aligned with the horizontal directions of the symbol, and sweeps the light beam thorough such raster. This approach requires repetitive scanning of the symbol, which in turn limits the speed of operation of the system. Moreover, it requires a scanner which is physically capable of generating a real raster at an arbitrary disposition, which in turn requires a more complex scanning system.

Swartz et al., U.S. Pat. No. 5,637,851 and Wevelseip, U.S. Pat. No. 4,691,367 disclose systems in which data captured by a raster scan is stored as a two-dimensional bit map in a computer memory. Such a two-dimensional bit map has individual bits of data representing the reflectivity of individual dots or "pixels" stored in a two-dimensional array within a computer memory. One dimension of the array corresponds to the vertical dimension of the real raster used to capture the data, whereas the other dimension of the array corresponds to location in the horizontal direction, along the scanning lines of such raster. For example, the reflectivity of the spot on the symbol at location X along scanning line Y will be represented by the data stored in the memory at location X, Y. The system generates virtual scan lines by calculating the addresses in memory corresponding to the locations of pixels which would fall along virtual scanning lines disposed at arbitrarily-selected angles to the real scanning lines. For example, a sequence of data at locations (X, Y); (X+1, Y+1); (X+2, Y+2) represents a scan line at an angle of 45° to the real scan lines. The system reads out the data in such a sequence of addresses. When the system finds an arbitrary angle which yields a "good" virtual scan line, i.e., a sequence of intelligible data corresponding to a possible symbol, the system generates additional virtual scan lines parallel to the first good scan line.

Such a system requires a sizable memory for storing all of the data and requires considerable computational effort to generate all the virtual scan lines, retrieve the data corresponding to the virtual scan lines and detect an intelligible symbol by trial and error. Moreover, real raster scan data has different resolutions in horizontal and vertical directions. A typical scan may include a few hundred horizontal lines covering the entire area scanned and hence has a relatively coarse resolution in the vertical direction. However, the scanning system typically can detect changes in reflectivity at several thousand points along the length of each scan line and hence has a relatively fine resolution in the horizontal direction. Some of this fine horizontal resolution typically is lost in the bit mapping approach.

It is desirable to represent the information contained in a scanned image as run length encoded data. In run length encoding, the data is presented as a series of numbers denoting the lengths of "runs" or series of pixels all having the same reflectivity, rather than by a series of identical data bits. For example, a sequence of 64 pixels all having the same reflectivity can be denoted by the digital number 64 (10000 in binary) rather than by a string of 64 ones in sequence. Alternatively, the number may specify the location of the end of the run relative to a fixed datum point. Run-length encoding greatly reduces the amount of data which must be handled during operation of the system. The scanner can produce run length encoded data during the scanning operation. However, the bit map operations used in the '851 and '367 patents cannot be performed on data in run-length encoded format.

Tsujimoto et al., U.S. Pat. No. 4,878,124 and Barski, U.S. Pat. No. 4,866,784 are directed to systems for rotating images other than rectilinear symbols as, for example, images of text in an optical character recognition system. These systems use run-length encoded data to determine the skew angles of edges, but do not attempt to rotate the data in run-length encoded form. Cayhill, III et al., U.S. Pat. No. 4,792,981 discloses a system involving a rather complex series of computations of "visible and invisible vectors" within a run-length encoded image and seeks to transform the run-length encoded data into a different frame of reference using criteria based on those vectors. Zhu et al., U.S. Pat. No. 5,581,635 describes a system for rotating run-length encoded data such as an image of text. That system however is only capable of rotating the run-length encoded data through pre-determined rotation angles having tangents which are rational numbers. These systems apparently have not been used in processing images of rectilinear symbols such as one-dimensional bar codes, PDF symbols and other two-dimensional code symbols. Thus, despite considerable effort in the art, there still remains a need for methods and apparatus which can decode a rectilinear symbol, particularly a two-dimensional symbol presented at an arbitrary, unknown angle to a raster scanner. In particular, there remains a need for a system which can function in real time, while an image is being scanned, using a limited of computational power and memories of limited size, but which can operate on high-resolution scanned images without loss of resolution.

The problems associated with processing scanned images are aggravated by factors such as cost and speed requirements. The task of translating scanned data into intelligible form may be performed by a computer associated with the scanner, rather than by a separate computer which may receive the data from the scanner. For example, in a point-of-sale system using a personal computer, conversion of the scanned image to a numeric data desirably is performed by a dedicated computer of limited capacity incorporated in the scanner, rather than by the central processing unit of the personal computer. Such a dedicated computer may be mounted on a circuit panel within the scanner itself, or incorporated in a plug-in interface card sold with the scanner and mounted in a computer which receives the scanned data. The load on such a dedicated computer must be limited if it is to convert the scanned data rapidly. Thus, despite all of the progress which has been made in development of low-cost, powerful computer hardware, it is still important to provide methods which minimize the computational load on the computer hardware. Even where the decoding operation is handled by a powerful computer used for other purposes, such as the CPU of a retail point-of-sale system, it is still important to minimize the computational load on the system. Moreover, the amount of data which may be handled and stored is limited either by the available on-board memory, or by the communication bandwidth between a scanner and a separate computer.

SUMMARY OF THE INVENTION

One aspect of the present invention provides a method of acquiring and processing data defining an image of a symbol having vertical and horizontal directions and having one or more horizontal rows of dark and light regions denoting information encoded in the symbol. The method according to this aspect of the invention desirably includes the steps of acquiring raw scan data representing an image of a region including the symbol using a real raster having real horizontal and vertical directions in a real raster frame of reference and having real scan lines extending in the real horizontal direction. The method further includes the step of run length encoding the raw scanned data so as to provide run length encoded data including transition point data denoting the locations of transitions between light and dark on the real scan lines. The method further includes the step of determining orientations of one or more directions of the symbol relative to the directions of the real raster and, using a transform based upon these orientations, transforming only the transition point data into a virtual scan frame of reference having virtual horizontal and vertical directions aligned with the horizontal and vertical directions of the symbol. Typically, the transforming step includes the step of mapping the transition data points onto virtual scan lines extending in the virtual horizontal direction.

Because only the transition point data is transformed, the amount of data which must be processed in the transformation step is markedly less than that which would be required for transformation of a full bit mapped image. The method can operate directly on run length encoded data, without converting the data back to a full bit map. Moreover, because the method can provide run length encoded data in the virtual scan frame of reference as its output. This run length encoded data is readily processed in further computational steps. Desirably, the step of determining orientations of the directions of the symbols relative to the directions of the real raster is performed by examining data derived from the real scan data as, for example, by examining the run length encoded real scan data to detect a skew angle between the direction of the symbol and the real horizontal direction or real vertical direction of the real raster.

The step of mapping the transition points onto virtual scan lines extending in the virtual horizontal direction desirably includes the step of finding crossing points of the real scan lines and virtual scan lines in a common frame of reference. Each transition point is associated with a crossing point adjacent to the transition point on the real scan line which incorporates such transition point. Each transition point is also associated with a virtual scan line which incorporates the crossing point associated with such transition point. The method further includes the step of determining a distance between each transition point and the associated crossing point along the real scan line incorporating the transition point and the associated crossing point. The distance along the real scan line obtained in the determining step is transformed to a distance along the associated virtual scan line. The system derives transformed data denoting the locations of the transition point on the virtual scan line associated with such transition point at the calculated distance, along the vertical scan line from the associated crossing point.

The method may include the steps of determining crossing locations of the scanning lines of the real raster and the virtual scanning lines and segmenting the real and virtual scanning lines into a plurality of segments, each such segment extending between two adjacent crossing points on the scan line which includes the segment. Thus, each real scan line segment is associated with a virtual scan line segment having a common crossing point with the real scan line segment. The transition points from each real scan line segment are mapped onto the virtual scan line segment associated with that real scan line segment so that the distance between the common crossing point and each transition point on the virtual scan line segment is proportional to the distance between the common crossing point and the same transition point on the real scan line segment. The use of a mapping based upon crossing points minimizes cumulative errors in the system caused by inaccuracies in determination of the skew angle.

In a method according to a further embodiment of the invention, each virtual scan line segment may be associated with two real scan line segments which have common crossing points at opposite ends of the virtual scan line segment. Transition points may be mapped onto the virtual scan line segment from both of these real scan line segments. The method may further include the step of comparing the locations of transition points mapped onto a particular virtual scan line segment from different real scan line segments to one another and deriving combined transition point data based upon such comparison. For example, the method may include the step of detecting two transition points mapped from different real scan lines and falling at less than a predetermined threshold distance from one another along the virtual scan line segment, and deriving a single transition point on the virtual scan line segment from such two or more transition points. As further discussed below, such a method further minimizes the effects of noise in the raw scan data and also minimizes the effects of digitization errors.

A further aspect of the present invention provides methods of processing data defining an image of a rectilinear symbol having linear features extending in vertical and horizontal directions. The method according to this aspect of the invention includes the steps of providing incoming image data representing a raster scan of the symbol having horizontal and vertical directions, the directions of the raster being in an unknown orientation relative to the directions of the symbol. The method further includes the step of examining the incoming image data to detect one or more linear features of the symbol, and determining the orientation of each such linear features relative to the frame of reference of the raster and selecting from the detected feature or features a feature extending at an angle of less than 45° to the horizontal direction of the raster. The method further includes the step of determining a skew angle between a direction of the symbol and a direction of the raster based upon the orientation of the selected feature. The method according to this aspect of the invention may further include the step of transforming the incoming image data based upon the skew angle to a virtual raster frame of reference having a horizontal direction aligned with the direction of the selected linear feature of the symbol.

Methods according to this aspect of the invention incorporate the realization that a more accurate estimate of the true skew angle can be obtained by detecting the inclination of a nearer-horizontal feature i.e., a feature of the symbol which lie close to the orientation of the raster lines, as opposed to near-vertical edges which are close to perpendicular to the raster lines of the scan. Methods according to this aspect of the invention can be used in conjunction with methods according to the foregoing aspects of the invention. Thus, the incoming image data may be the real raster scan data or the run length encoded real raster scan data, and the step of transforming the image data may be performed using the virtual scan and crossing points as discussed above. The skew angle determination typically is based on the assumption that the true horizontal direction of the symbol lies at less than 45° to the horizontal direction of the raster. Typically, methods according to this aspect of the invention are performed using plural sets of incoming image data each representing a raster scan of the symbol at a different orientations. The examining, selecting and transforming steps desirably are performed independently for each set of incoming image data. The plural sets of incoming image data may include at least three sets of incoming image data representing rasters having horizontal directions oblique to one another as, for example, at angles of 60° to one another. Thus, at least one set of incoming image data will have a horizontal direction oriented at an angle of less than 45° to the horizontal direction of the symbol and hence will yield intelligible data when transformed based upon the skew angle derived for that set of incoming image data.

Preferably, the step of examining the incoming image data to detect edges of the symbol includes the step of evaluating a function of location in the raster frame of reference associated with the incoming data and an assumed skew angle over a plurality of points represented by the incoming image data and over a plurality of assumed skew angles for each such point. The function desirably has the property that points lying on a line in the symbol will yield the same value of the function when the assumed skew angle is equal to an angle between the line and a direction, of the raster frame of reference. Desirably, the step of examining the incoming image data includes the step of counting the number of points which yield particular values of the function at each assumed skew angle and selecting as the skew angle an angle equal to the assumed skew angle associated with the highest count of points. For example, the function may be a Hough transform ρ such that:

$$\rho = x \cos \theta + y \sin \theta$$

Where X is the coordinate of the point in the horizontal direction of the raster;

Y is the coordinate of the point in the vertical direction of the raster and

θ is the assumed skew angle.

As further discussed below, because a rectilinear symbol has large numbers of transition points lying along straight lines extending in the vertical and horizontal directions of the symbol, large numbers of these points will fall on the same line in the raster frame of reference, and give the same value of ρ when the assumed skew angle θ is equal to the actual skew angle. Thus, by selecting the assumed skew angle θ which gives the largest number of points having the same value of ρ, the system selects a skew angle corresponding to the real skew angle between a direction of the symbol and a direction of the raster.

Preferably, the step of examining the incoming data further includes the step of testing transition points in the incoming image data to determine spacings between these points and excluding from the step of excluding the Hough transform or other fraction those points in the incoming data representing transitions disposed at less than a preselected threshold distance from other transitions. This step will exclude some transition points representing within the interior of the symbol, and simplifies the skew angle calculation without serious loss of accuracy.

Still further aspects of the invention include equipment operable to perform the aforesaid methods and programming elements operative to actuate a programmable computer to perform such methods. The programming elements incorporate a data storage medium such as a disc, tape, programmable read only memory ("PROM") or other medium capable of storing information and program information stored therein, the program information including instructions operative to actuate a computer to perform methods as aforesaid.

These and other objects, features and advantages of the present invention will be more readily apparent from the detailed description of the preferred embodiments set forth below taken in conjunction with the accompanying drawings.

DETAILED DESCRIPTION OF THE PREFERRED EMBODIMENTS

Figure 1:
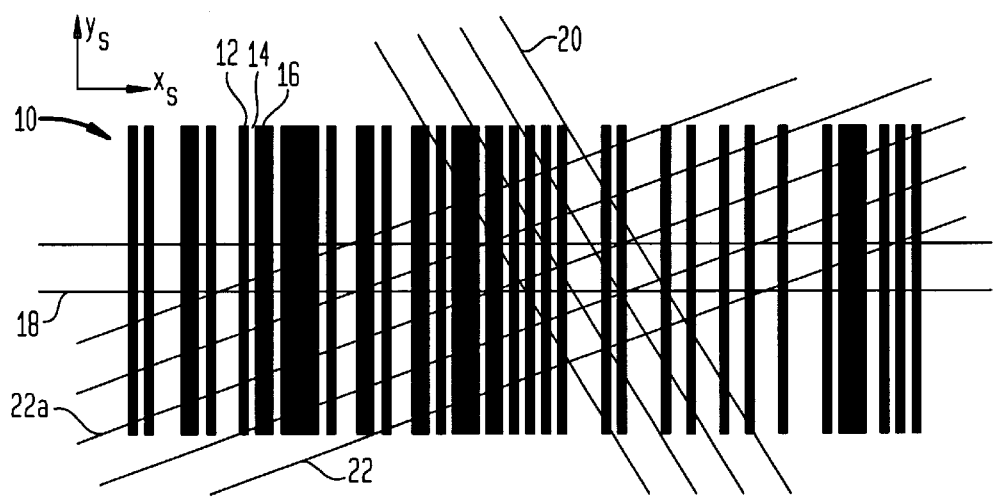
FIG. 1 is a diagrammatic view of a one dimensional bar code together with scanning lines of rasters.
Figure 2:
FIG. 2 is a diagrammatic view of a two-dimensional PDF code symbol together with scanning lines of rasters.

Apparatus in accordance with one embodiment of the invention includes a conventional scan engine 30. The scan engine includes optical and sensing elements 32 arranged to generate a beam of light 34 and to sweep the beam along rasters in a focal plane 37, and detect light 38 reflected from focal plane 37. For example, optical and sensing elements 32 may include a light source 42 such as a laser and a moveable optical element such as a mirror, prism, lens, or holographic optical element 44 connected to a movement device 46 such a motor. The optical and sensing elements further include a photodetector 48 for detecting the reflected beam. The photo detector 48 is arranged to provide an electrical output such as a voltage or current. This output is connected through conventional analog amplification and filtering devices (not shown) to a digitizing circuit 50 arranged to provide a first digital output (e.g., 1) when the intensity of reflective light 38 is below a certain threshold and to provide a second, opposite digital output (e.g., 0) when the intensity of the reflected beam is above such threshold.

The optical and sensing elements 32 are arranged to sweep the beam along horizontal scanning lines 28 of a first real raster 36. The real raster has horizontal direction $X_{r1}$ and a perpendicular vertical direction $Y_{r1}$ and has the scanning lines 28 extending in the horizontal direction $X_{r1}$. Optical and sensing elements 32 are synchronized with an internal clock 40, so as to sweep beam 34 along the lines of raster 28 in a preselected order and at predetermined speed so that the location of beam 34 in raster 36 bears a known relation to time as measured by clock 40. Typically, the optical and sensing elements are configured so that beam 34 sweeps through each line 28 raster 36 at a constant speed, and hence position along each line in direction $X_{r1}$ is a linear function of time. The optical and sensing elements may be arranged to move the beam through the various lines 28 of the raster in order of their position in the vertical or $Y_{r1}$ direction of the raster. The digitization circuit is arranged to clock out a series of values in synchronism with the clock 40 of the scan engine and provide a series of digital values representing reflectivity at focal plane 37 at a series of times, and hence at a series of positions along the various scan lines 28. The scan engine further includes a run length encoding circuit 52 arranged to convert the stream of digital values from the digitalization circuit 50 into a series of run length values representing the length of each sequence of a ones and zeros either directly as numbers denoting the length of the run or indirectly, as numbers denoting the ending position of the run in the $X_{r1}$ direction.

Scan engine 30 is also arranged sweep beam 34 through a second raster 56 having a horizontal direction $X_{r2}$ and vertical direction $Y_{r2}$ different from the horizontal and vertical directions $X_{r1}$, $Y_{r1}$ of first raster 36. Similarly, the scan engine is arranged to sweep the beam through a third raster 58 having yet another set of horizontal and vertical directions $X_{r3}$, $Y_{r3}$ at yet another orientation in focal plane 37. The horizontal directions $X_{r1}$; $X_{r2}$; $X_{r3}$ of the various rasters are disposed at angles of approximately 60° to one another. The clock, digitization and one length encoding circuits are arranged to provide run length encoded data reflecting resistivity along the various lines of the second and third rasters 56 and 58 in the same manner as discussed with reference to the first raster 36. Typically, the scanner can generate a set of plural rasters at each of several focal planes. The data from all of these rasters can be handled in the same manner as the data from the single focal plane 37 depicted in FIG. 3. Alternatively, information from the various focal planes can be examined to determine whether or not it includes data which might denote a symbol, as, for example, an appreciable number of transitions. Data from focal planes which do not include an appreciable number of transitions may be discarded before further processing.

Various commercially available scan engines are available to perform the functions of scan engine 30. For example, a scanner sold under the registered trademark HOLOTRAK by Metrologic Instruments, Inc. of Blackwood, N.J., the assignee of the present invention utilizes movable holographic elements to produce a two dimensional raster scan. Scanners of this type are also described in co-pending, commonly assigned U.S. patent application Ser. No. 08/573,949, filed Dec. 18, 1995, the disclosure of which is hereby incorporated by reference herein. Other scanners, such as those sold under the registered trademark TECH 7 by Metrologic Instruments use moving mirrors to generate the raster. Still other scanners use ambient light or light from a diffuse source to illuminate the entire focal plane and use a photodetector having a narrow focal spot with moving optical elements to sweep the focal point of the photo detector over the over the raster pattern. Where the object itself is moving as, for example, where the object is disposed on a conveyor belt or on a moving vehicle, the scanner may use the object motion to sweep the focal spot of the illuminator or photodetector across the object surface. Still other scanners use one-dimensional or two-dimensional arrays of photodetectors such as a CCD array to acquire reflectivity values from numerous points simultaneously as, for example, from all of the points in a scan line or all points of a two-dimensional raster, and then read out these values as a sequence of data. The configuration of the scan engine, including the selection of particular optical and electronic elements forms no part of the present invention. Any scan engine capable of generating raster scanned data representing reflectivity of the surface can be employed. Indeed, where the symbol is disposed on a transparent object, the scanner can direct light through the symbol and hence detect transmissivity rather than reflectivity.

The scan engine typically is employed with some system for presenting objects 60 bearing symbol 25. In the particular arrangement illustrated in FIG. 3, the objects 60 are carried by a conveyor 62. Objects 60 are disposed with symbol 25 lying in focal plane 37, but with the symbols disposed at random orientations. That is, the horizontal direction $X_s$ and vertical direction $Y_s$ of each symbol 25 extend in focal plane 37 but lie at unknown, randomly selected angles with respect to the horizontal and vertical directions $X_{r1}$, $Y_{r1}$ of first raster 36 and at similarly unknown, random angles with respect to the horizontal and vertical directions of the second and third rasters 56 and 58. In other applications, the beam emitting and sensing components of the scan engine may be hand held and swept over the objects, or the objects may be hand held in proximity to the optical elements.

The apparatus further includes a computer 70 for performing the skew detection, transformation and other steps discussed below. Computer 70 incorporates a data memory 72 which may be implemented by any medium capable of reliably accepting and discharging digital data as, for example, a mass storage device such as a disc or tape drive or, preferably, an electronic or random access memory. The device further includes a microprocessor 74 capable of performing logical and arithmetic operations on digital data according to a stored program. Additionally, the computer includes a program memory capable of storing instructions and delivering the same to microprocessor 74. The program memory may be of any suitable type capable of retaining program information as, for example, a magnetic disc, optical disc, programmable read only memory (PROM) or CMOS memory. The program memory 74 stores a program which causes computer 70 to execute the steps discussed below. The programming language used to denote these steps can be any language compatible with the particular hardware constituting the computer. The computer further includes conventional output devices 78 for linking microprocessor 74 to displays or other computer systems which can utilize the data to be read from symbols using the invention.

Computer 70 may be implemented as part of a conventional general purpose computer, as, for example, as elements of a conventional personal computer. Microprocessor 74 may be a conventional processor of the type commonly found in personal computers as, for example, an Intel Pentium processor. As is well known to those skilled in the art of computer architecture, such a computer includes conventional data busses linking the various elements to one another and also includes necessary support devices such as power supplies, data bus control elements and the like. Alternatively, the elements of computer 70 may be implemented as a small, special purpose computer as, for example, on a circuit bussed physically incorporated into scan engine 40 or physically incorporated into a larger computer. Such a computer may utilize any conventional architecture for organizing information interchange among its various components. Also, although the various components of computer 70 are illustrated separately from one another, some or all of these components can be integrated into a single physical device, as for example, a single semi-conductor chip. Further, the components of computer 70 can be integrated with the electronic components of scan engine 30.

Figure 4:
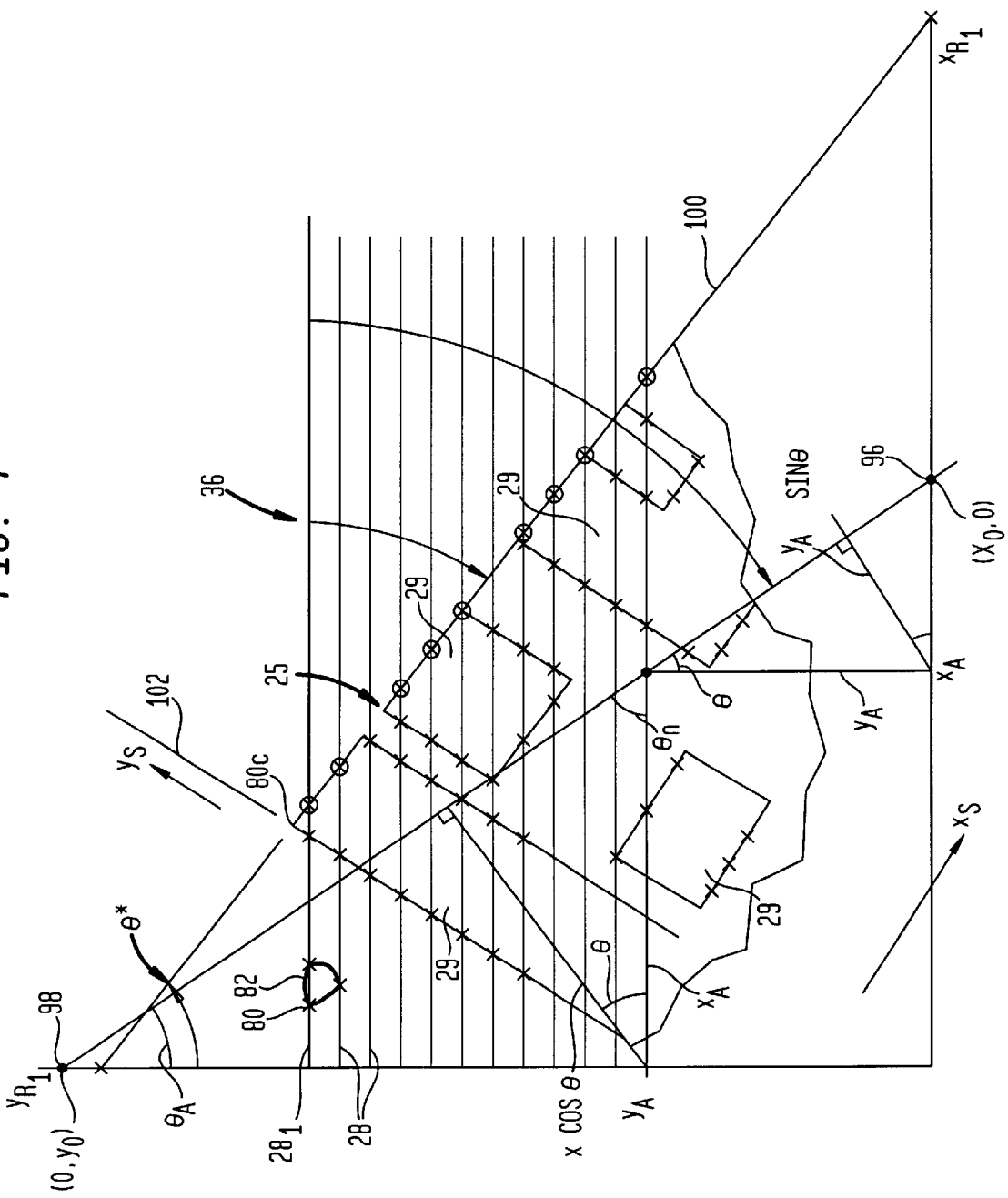
FIG. 4 is a diagram illustrating certain geometrical relationships utilized in a skew angle determination method according to one embodiment of the invention.

Computer 70 receives run length encoded data representing the results of scanning using the various rasters and stores this data in data memory 72. A small portion of the data representing the first real raster 36 is depicted in FIG. 4. The data includes a large number of transition points 80 representing boundaries of the block-like features constituting symbol 25. These transition points lie at intersections of the raster lines 28 with the borders of these features. The data may further include spurious transition points such as those found at the borders of a dark spec 82 lying on the surface of the package adjacent the symbol. As apparent from inspection of FIG. 4, the true transitions 80 associated with the actual borders of the features in symbol 25 lie along straight lines extending in directions parallel to the horizontal direction $X_s$ and vertical direction $Y_s$ of the symbol.

These directions are disposed at an unknown angle to the horizontal and vertical directions $X_{r1}$, $Y_{r1}$ of raster 36.

Figure 5:
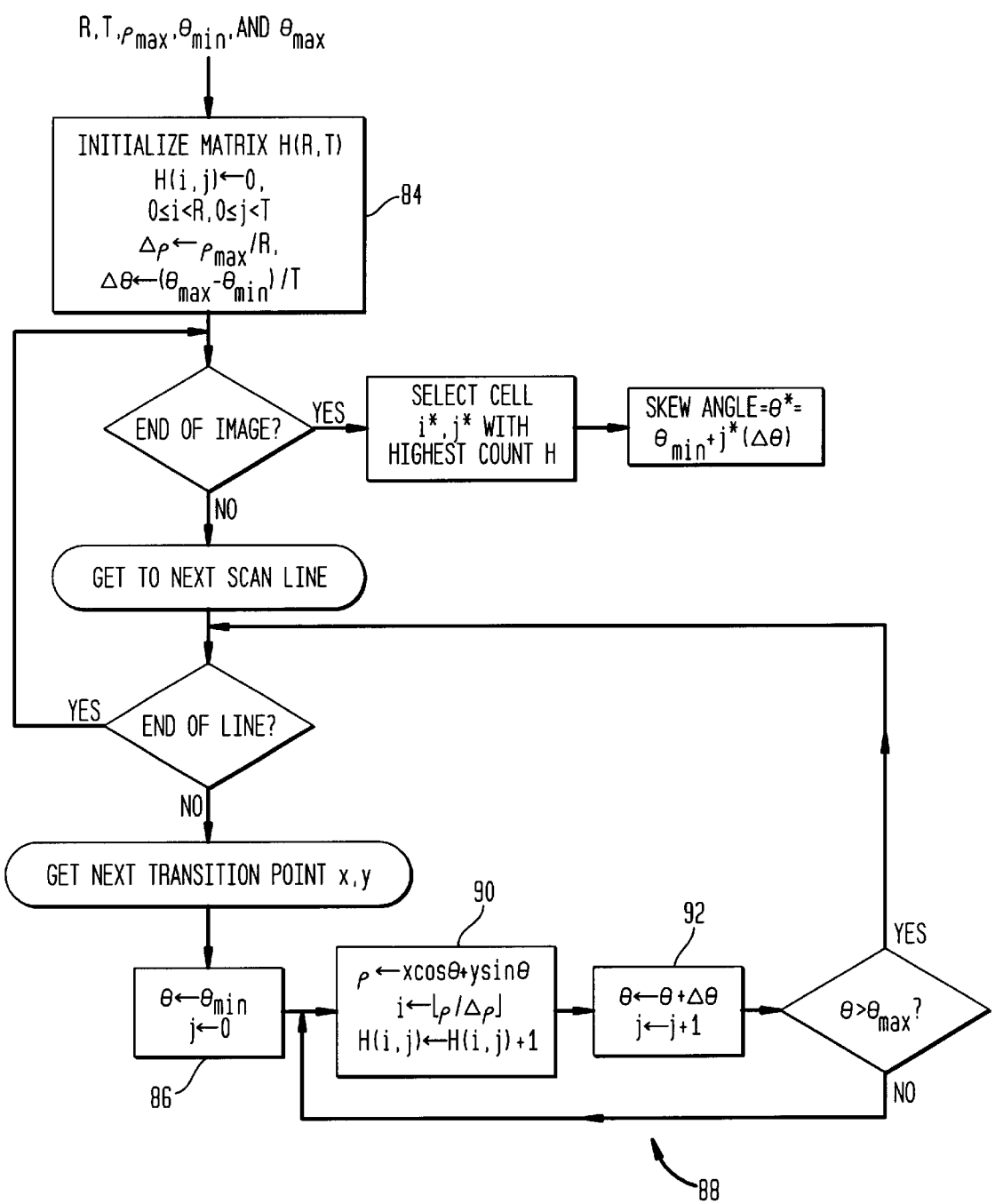
FIG. 5 is a flow chart depicting steps of the skew angle determination method of FIG. 4.

In a skew angle estimation method, according to an embodiment of the invention, the computer executes the steps illustrated in FIG. 5. The program supplies user designated values of certain variables. These include the size of a two dimensional array of accumulator cells, given as integers R and T; the diagonal length of raster 36 $\rho_{max}$ and a range of skew angles to be tested, given as values $\theta_{min}$, $\theta_{max}$. Preferably, this range is selected to denote a range of angles within about 45° of the horizontal direction $X_{r1}$. As illustrated in FIG. 4, the system of notation denotes data as an angle with the vertical axis $Y_{r1}$. Therefore, $\theta_{min}$ desirably is about 45° and $\theta_{max}$ desirably is about 90°. The accuracy of skew angle determination increases with the size of the matrix R, T. However, the computational complexity is proportional to the product of R and T. Desirably, this product is much less than the number of transition points which will be encountered in the scan. For practical applications values of R between about 64 and 1024 and values of T between about 10 and 30 give satisfactory results. In an initialization step 84, the computer initializes the matrix for all values of index variables i, j lying within the designated size of the matrix. The computer also calculates increments of $\Delta\rho$, $\Delta\theta$ as follows:

$$\Delta\rho = \rho_{max}/R$$

and $$\Delta\theta = (\theta_{max} - \theta_{min})/T.$$

The computer then examines each transition point 80 denoted by the data. The coordinates of the transition points are the coordinates X, Y in the first real raster frame of reference $X_{r1}$, $Y_{r1}$. For each transition point, the computer initializes $\theta = \theta_{min}$ and j=0 (step 86) and then enters a loop 88. In step 90 of loop 88, the system applies a current value of $\theta$ ($\theta_{min}$, on the first pass through the loop) and calculates a value $\rho$ for the transition point in question based upon the coordinates X, Y of the transition point. The computer then normalizes the value of $\rho$ by dividing it by $\Delta\rho$ and rounds the normalized value to the nearest integer. This rounded is then taken as the value of an index variable i. The computer then increments the count in cell H (i, j) by one. Next, the computer increments the value of j by one and thus increases the current value of $\theta$ by $\Delta\theta$ (step 92). Provided that $\theta$ does not exceed $\theta_{max}$, the system returns to step 90. The index value j denotes the $j^{th}$ step in the stepwise variation of $\theta$ from $\theta_{min}$ to $\theta_{max}$. Thus, in each pass through loop 88, the system uses a value of $\theta$ denoted by the $j^{th}$ step in such step wise variation of $\theta$ to calculate the value of $\rho$, normalizes the value and increments a counter H (i, j) corresponding to the value of $\theta$ used in the test (index variable j) and the resulting normalized value of $\rho$ (index variable i). The system continues this process until the full range of j, corresponding to $\theta_{min}$ to $\theta_{max}$, has been tested for the particular point. The system then selects the next point on the same raster line and repeats the process using loop 88. This continues until all transition points on the raster line have been treated, whereupon the system repeats the process for the next raster line, until all transition points on all raster lines have been treated. The system then selects the particular cell having the greatest count value H stored therein. The skew angle is taken as the value of $\theta$ corresponding to the j value of that cell, i.e., the skew angle is taken as $\theta^* = \theta min + j^*(\Delta\theta)$ where $j^*$ is the index variable j of the cell with the greatest count 17.

The physical significance of this procedure can be appreciated with reference to FIG. 4. For any value of $\theta$, all points which lie on a straight line at angle $\theta$ will yield the same value of $\rho$. As noted above:

$$\rho = X \cos\theta + Y \sin\theta$$

At point 96 having coordinates $(X_0, 0)$ $\rho_{96} = X_o \cos\theta$ At point 98 having coordinates $(0, Y_0)$, $\rho_{98} = X_o \sin\theta$. But for any angle $\theta$, $$\tan\theta = \frac{\sin\theta}{\cos\theta} = \frac{X_0}{Y_0}.$$

Therefore:

$$X_o \cos\theta = Y_o \sin\theta,$$

and $$\rho_{96} = \rho_{98}.$$

The same value of $\rho$ holds for all intermediate points on the line. Because symbol 25 is rectilinear symbol, having edges extending the horizontal and vertical directions $X_s$, $Y_s$ of the symbol, large members of points lie on certain lines extending at angle $\theta^*$ corresponding to the orientation of these axes. For example, a large number of points lie along line 100 extending parallel to the horizontal axis $X_s$ of the symbol. Therefore, all of these points will yield the same value of $\rho$, and hence the same value i when the system tests these points with a particular value of j for which $\theta = \theta^*$. All of these points will cause the counter H (i, j) for these values of i and j to be incremented. By contrast, at other values of j corresponding to lines disposed at oblique angles to the horizontal and vertical directions $X_s$, $Y_s$ of the symbol intercept only a few points lying on a common straight line having a common value of i. Therefore, the counts H (i, j) associated with these values of i and j will be low. Noise transition points such as the spurious points associated with dirt spot 82 will cause a few spurious counts to be added to some of the counters at random. However, these effects generally are insignificant and do not affect the operation of the system.

As stated above, the range of $\theta$ used for each raster desirably is about 45°, and corresponds to a range of orientations between the horizontal direction of the raster and 45° from horizontal (the rein from $\theta = 45$, to $\theta = 90$ as seen in FIG. 4). This system has no capability to discriminate between the actual horizontal and vertical directions of the symbol. For example, a large number of points also lie along line 102 in the vertical directions $Y_s$ of symbol 25. If this vertical direction were oriented within the range of angles tested by the system, the system would return a skew angle corresponding to the vertical direction of the symbol. As pointed out above, the system generates data from three separate rasters 36, 56 and 58, having raster frames of reference oriented at 60° relative to one another. The data for each raster is treated separately in exactly the same way as the data for raster 36. For any given orientation of the symbol, the true horizontal axis of the symbol will lie within 45° of the horizontal axis of one raster. The system will return the correct skew angle, corresponding to the orientation of the horizontal axis of the symbol in the frame of reference of that raster.

A skew estimation method according to an alternative embodiment (FIG. 6) operates in the same manner as described above. However, in the method of FIG. 6, the computer selects two points lying on the same line of the raster and having coordinates (X,Y and $X_L$,Y) respectively, where $X_L$ is less than X. The computer tests each transition point to determine whether the transition point is a transition from mark to space or from space to mark. If the transition point is a transition from a mark to space, the computer branches along branch 106, discards the lone transition point $(X_L, Y)$, replaces it with (X, Y), and then selects the next transition point on the same raster line the new higher valued point (X, Y). After the computer has found two transition points (X, Y) and $(X_L, Y)$ which both represent transitions from space to mark, the computer tests the two transition points to determine if they are separated from one another by more than a preselected threshold L. If not, the program branches along line 108 and the computer again discards the lower valued transition point $(X_L, Y)$, replaces it with the higher valued transition point (X, Y) and again selects another transition point as the new, higher value transition point (X, Y).

Figure 6:
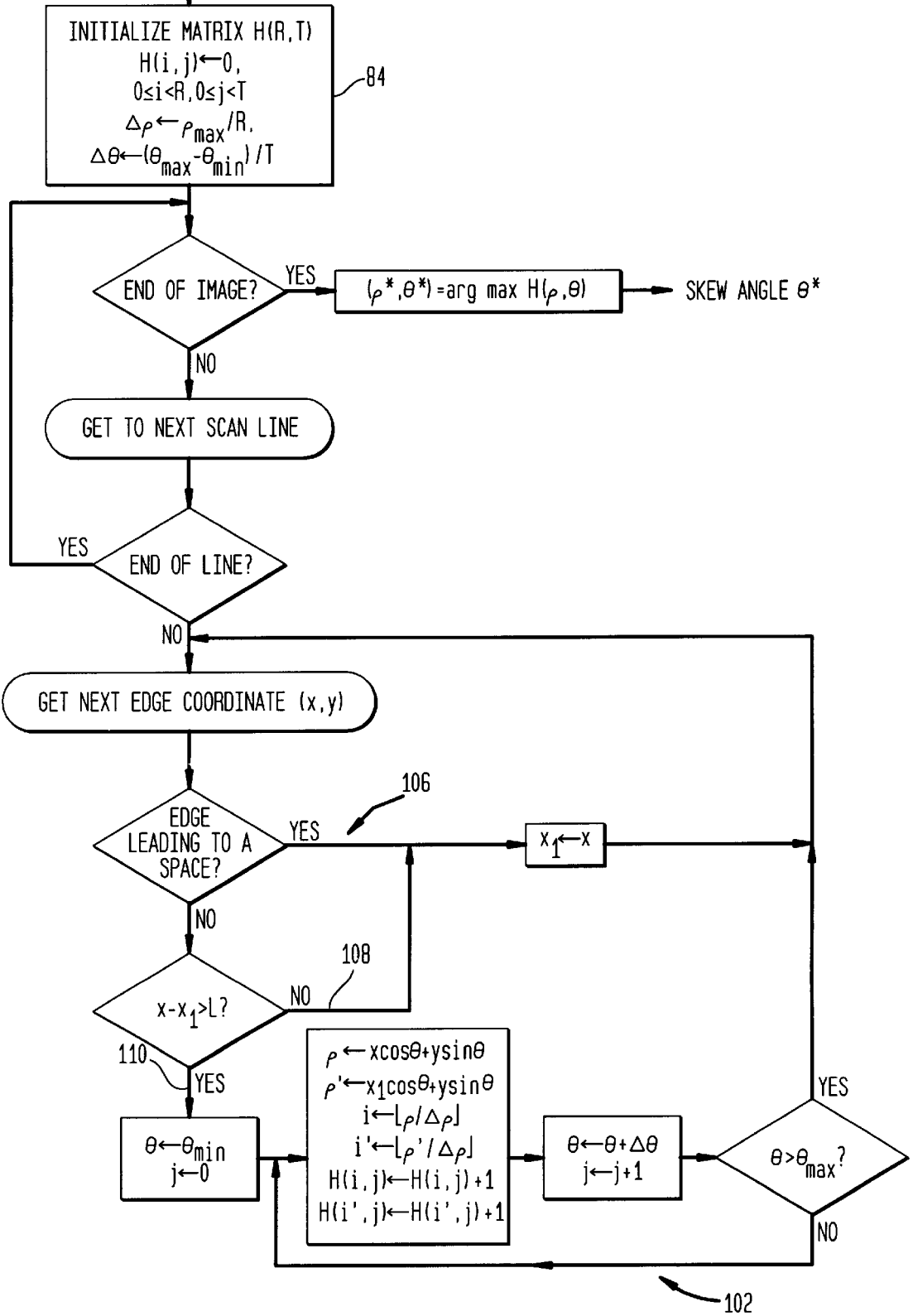
FIG. 6 is an alternate flow chart depicting a skew angle determination method in accordance with an additional embodiment of the invention.

Once the system has found a pair of transition points both of which are transition points from space to mark and which are separated from one another by more than threshold L, the routine passes along branch 110 and enters a loop 102 similar to the loop 88 discussed above with reference to FIG. 5. However, on each pass through loop 102, the computer processes both points $(X_L, Y)$ and (X, Y) and calculates the values of ρ for both points in parallel. Here again, the system accumulates counts at counters H (i, j) where i denotes the normalized value of ρ for a given point and j denotes the stepwise or incremental value of θ used in the particular test. Here again, each of the points $(X_L, Y)$ and (X,Y) is tested with various values of θ (different values of j) and one counter H (i, j) is incremented for each point in each test. In exactly the same manner as discussed with reference to FIGS. 4 and 5, all of the points lying on a straight line will yield the value of ρ (and hence the same value of i) when tested with the value of j corresponding to the angle θ although the line through these points. Here again, the particular counter having the highest count after all of the transition points have been processed, is the counter having the value drawn corresponding to the angle between an axis of the symbol and an axis of the raster. In the method of FIG. 6, the system ignores those transition points corresponding to transitions from space to mark and also ignores transition points which are close to one another. This causes the system to ignore many transition points within the interior of the symbol, but finds transition points near the edges of the symbol. This drastically reduces the number of individual points examined in the skew estimation algorithm and drastically reduces the number of times the system passes through loop 102.

Figure 7:
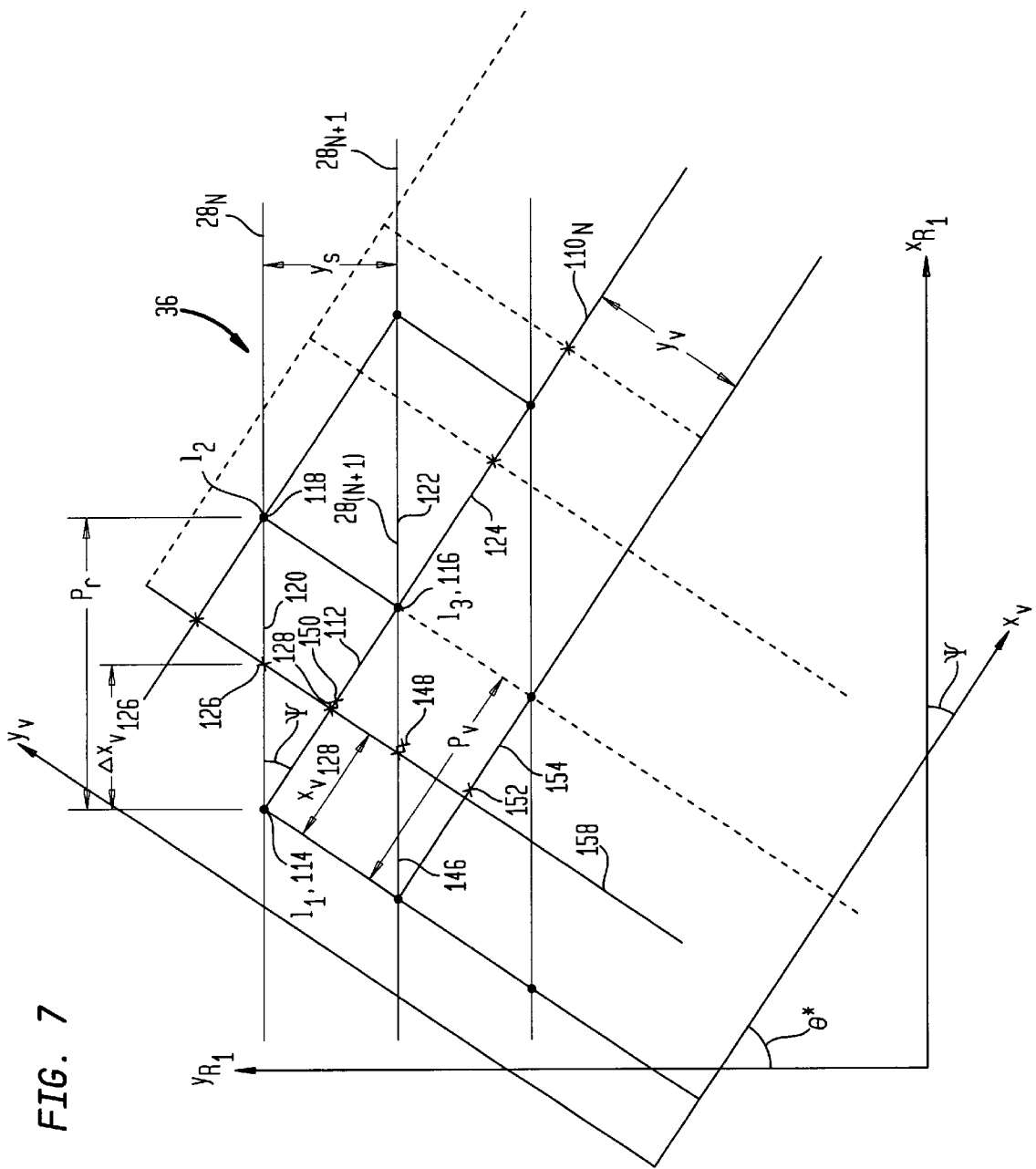
FIG. 7 is a diagram depicting certain geometrical relationships used in a transformation method according to one embodiment of the invention.
Figure 8:
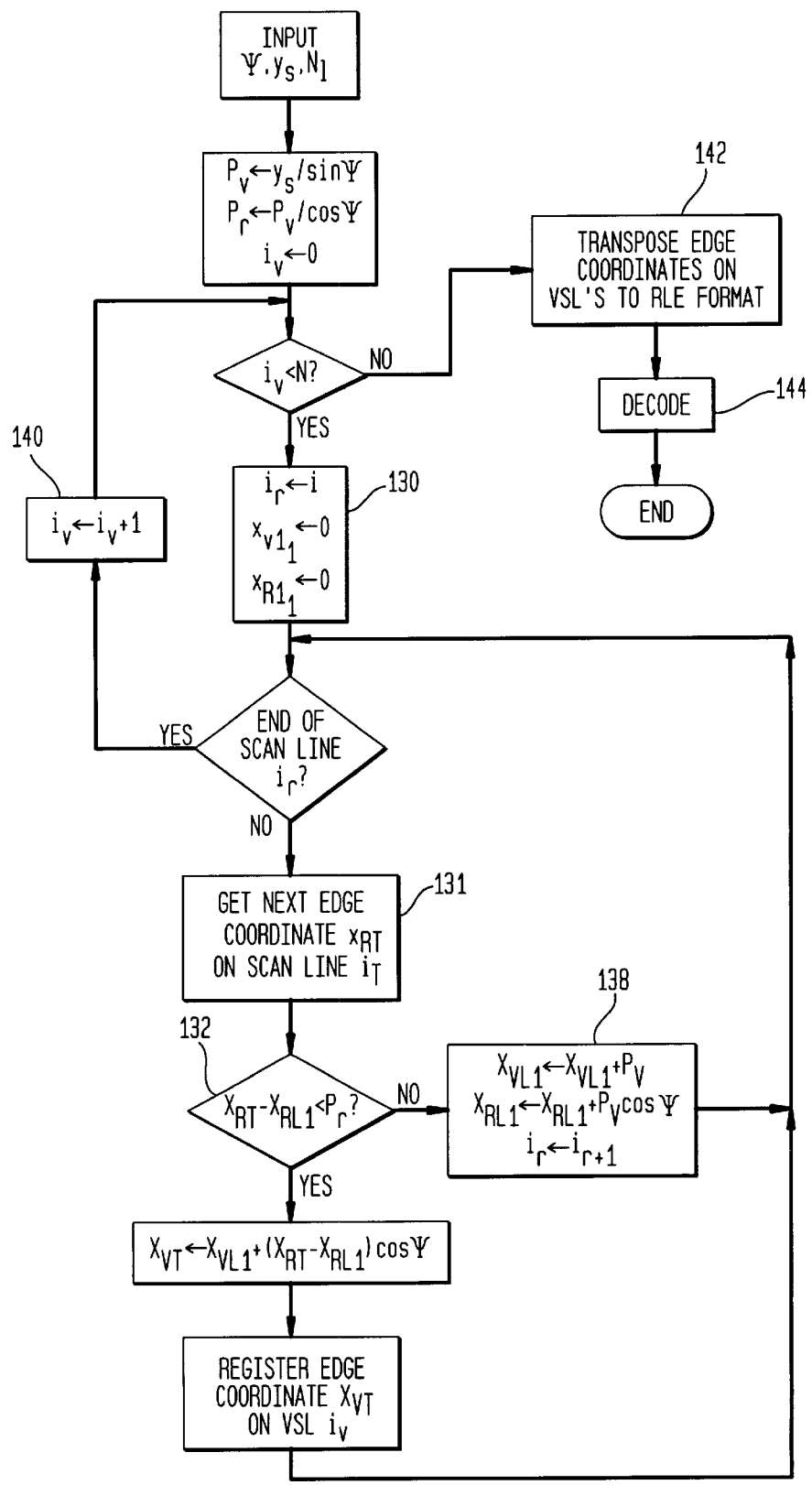
FIG. 8 is a flow chart depicting certain steps of the transformation method of FIG. 7.

Once the computer has performed the skew estimation routine as described above, it passes to the transformation routine illustrated in FIGS. 7 and 8. In the transformation routine, the system maps the transition points on each of the three rasters 56, 58 (FIG. 1) onto virtual rasters lying at an angle to real raster corresponding to the skew angle estimated for such real raster in the skew angle estimation step. Thus, the transition points running on the raster lines 28 of first raster 36 are to be transformed into transition points lying on virtual raster lines 110 of a virtual raster having its horizontal axis $X_v$ lying at an angle ψ to the horizontal axis $X_{r1}$ of the real raster 36. Angle ψ is a representation of the skew angle θ* discussed above. Because different systems of notation are used with respect to different steps, angle ψ is, numerically, the complement of angle θ*, i.e., (90-θ*). In the transformation routine, the computer is supplied with the skew angle ψ derived in the skew angle estimation steps, the known physical spacing or distance $Y_s$ between adjacent lines 28 of the real raster 36 and the number of lines in the virtual raster N.

The scanning lines of the virtual raster do not exist as real physical entities. Rather, they are geometrical abstractions. Moreover, these lines have theoretical locations in the frame of reference of the real scan 36. This frame of reference is depicted in FIG. 7. As shown, the vertical scan lines 110 extend parallel to one another at a line spacing, $Y_v$ which is equal to the line spacing $Y_s$ of the real raster, and intersect the lines 28 of the real raster. The computer calculates a partition length $P_v$ (FIG. 7) corresponding to the length of a line segment 112 between a first crossing point where a particular virtual scan line $110_N$ crosses a given scan line $28_N$ of the real raster and a second crossing point 116 where the same virtual scan line crosses the next adjacent, higher ordered scan line $28_{(N+1)}$ of the real raster. The computer also calculates the length $P_R$ of a line segment between the intersection of crossing points 114 and 118 corresponding to the intersections of two adjacent virtual scanning lines with the same real scanning line. By the geometry illustrated in FIG. 7, $P_v = y_s/\sin \psi$, $P_{r1} = P_v / \cos \psi$.

As discussed below, the system establishes an association between line segments on real scan lines 28 and lines segments on virtual scan lines 110. For example, line segment 120 and real scan line $28_N$ is associated with line segment 112 on virtual scan line $110_N$. The two associated line segments shares a common crossing point 114 at the left hand ends of the line segments as seen in FIG. 7, i.e., at the end of real line segment 120 having the lowest the value of real raster horizontal coordinate $X_{r1}$ and at the end of virtual scan line 112 having the lowest value of virtual horizontal coordinate $X_v$. Similarly, the line segment 122 along line $28_{(N+1)}$ of the real raster 36 shares a common left hand crossing point 116 with virtual line segment 124 and hence real line segment 122 is associated with that virtual line segment. The system maps the transition points on each real line segment into virtual transition points on the associated virtual line segment by transforming the distance between the common crossing point and the transition point along the real line segment into distance between the common crossing point and the new, virtual transition point. For example, the distance $\Delta X_{r126}$ from common crossing point 114 to transition point 126 along the real line segment 120 is transformed into a distance $\Delta X_{v128}$ between the common crossing point the virtual transition point 128 on virtual line segment 112. For any given transition point, $\Delta X_v = \Delta X_r \cos \psi$.

The computer routine for performing this transformation is shown in FIG. 8. The system first sets a counter $i_v$ denoting a virtual scan line to 0, hereby selecting the first virtual scan line. In an initialization step 130 for the selected virtual scan line, the system initializes the value of the location of the first common crossing point and positioning it at the left hand of end of the virtual scan line and on real scan line $i_r$, where $i_r = i_v$. Thus, the computer sets the real and virtual X over denotes $X_r$ and $X_v$ to 0. The system calculates the position of the right hand end point $l_2$ or 118 of the first real line segment, i.e., the point along the $I^{th}$ real scan line a distance $P_r$ from the left hand common crossing point $l_1$ or 114. The system also calculates the location of the right hand end of the virtual line segment 116 or $L_3$. The system then checks for the first transition point or edge coordinate $X_{rt}$ on the $I^{th}$ real scan line, i.e., the real scan line 28 containing the particular line segment. In step 132, the system calculates the distance of the next transition point from the common crossing point 114 or $L_1$. If this distance is less than the length of the real line segment $P_r$, then the system has found a transition point within the real line segment and the system branches to step 136, where it calculates the horizontal or $X_v$ coordinate of the virtual crossing point on the virtual scan line by the formula.

$$X_{vt} = X_{VL1} + (X_{Rt} - X_{RL1})\cos \psi$$

$X_{vt}$=The virtual horizontal ($X_v$) coordinate of the virtual transition point on the virtual scan line;

$X_{vL1}$=The virtual horizontal ($X_v$) coordinate of the left-hand common crossing point on the virtual scan line;

$X_{RT}$=The real horizontal ($X_R$) coordinate of the transition point on the real scan line;

$X_{RL1}$=The real horizontal ($X_R$) coordinate on the real scan line of the common crossing point.

Thus, in the step the system maps the distance from the left hand, common crossing point $L_1$ or 114 from the real scan line segment 120 onto the associated virtual scan line segment 112. The system then records the coordinate $X_{v7}$ of the transition point on the virtual scan line. The system then returns to step 131 and examines the next transition point on the same real scan line. If the next transition point also lies within the same real line segment, the system will again branch back to operation 136 and map the next transition point onto the same virtual line segment. However, if the next transition point along this real scanning line lies beyond the end of the real line segment 120, the system will not attempt to map the transition point onto the virtual line segment. Instead, the system will branch to operation 138, where it selects the next virtual line segment along the same virtual scan line. The system selects the next real scanning line. The system selects a new left hand common crossing point on this next line at location 116 or L3, corresponding to the right hand end of the previously used virtual line segment. Here again, the system selects a real line segment having length $P_r$, such as line segment 122 of FIG. 7 on this next real scanning line and selects the virtual line segment 124 having length $P_v$. Using these new line segments, and the new common crossing point 116, the system repeats the same operations. This continues until the system reaches the right hand end of a real scanning line, whereupon the system branches to operation 140, when it selects the next virtual scan line. The system then reinitializes for the new virtual scan line and passes through the same operations discussed above. This continues until the system has performed the same operations for all virtual scan lines.

Figure 3:
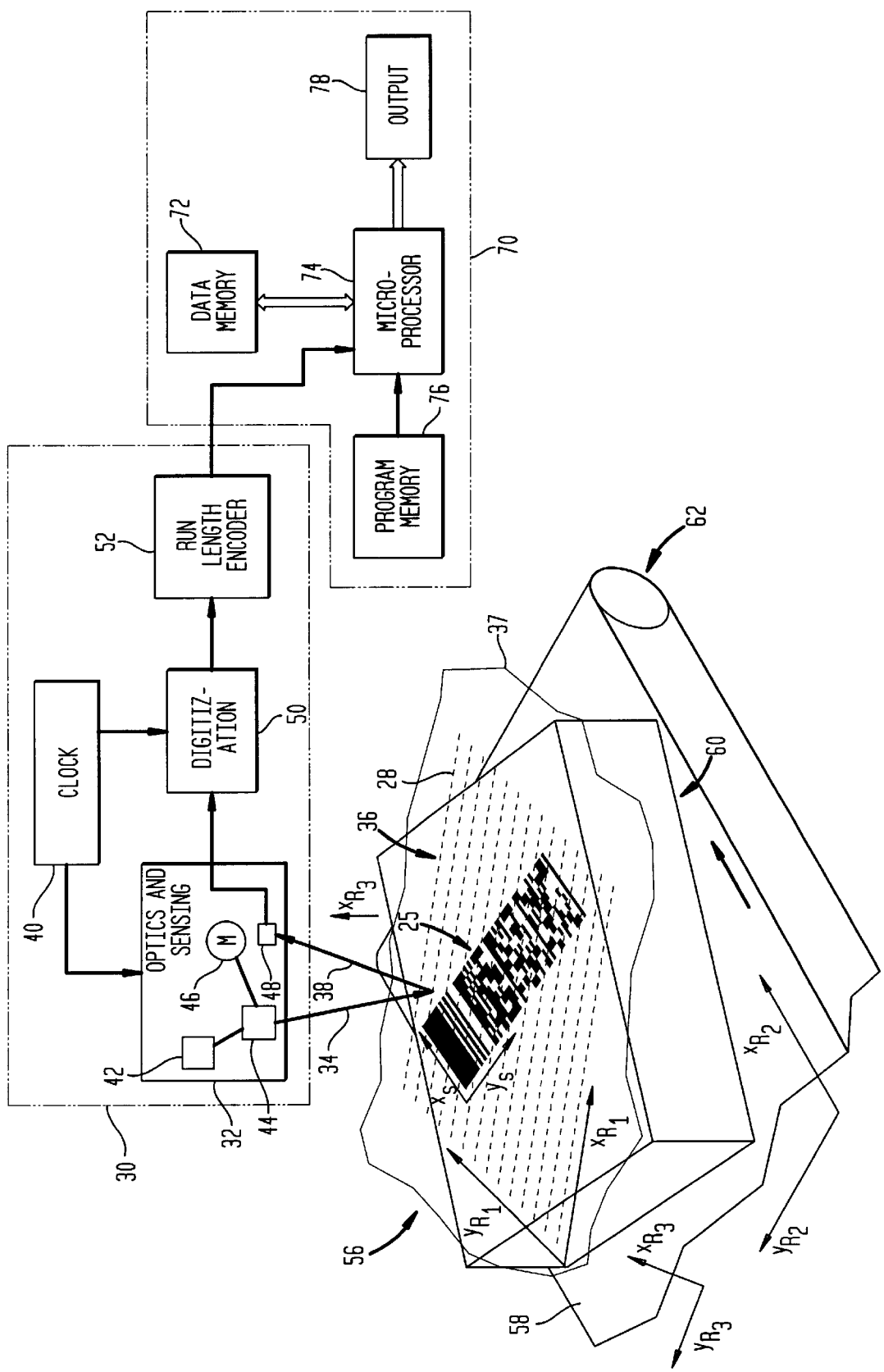
FIG. 3 is a diagrammatic view depicting apparatus in accordance with one embodiment of the invention.

At the end of this process, the system has mapped the locations of the transition points into virtual scan lines 110 constituting a virtual raster having its horizontal direction aligned with the horizontal direction selected in the skew estimation step, and aligned with the horizontal direction $X_s$ of symbol 25 (FIG. 3). The horizontal coordinates of these virtual transition points are stated directly as coordinate $X_{vT}$ values for virtual transition points falling along each virtual scan line. In step 142, the coordinates values can be transposed to any convenient run length including format as, for example, a first value denoting the first transition point on a virtual scan line and whether such transition is a transition from space to mark or mark to space, and a series of subsequent values denoting run lengths to the next following transition. The system then decodes these run length encoded values in the conventional manner to yield numeric or alphanumeric information encoded in the symbol. The particular decoding algorithm depends entirely on the specifics of the symbol. For example, numerous algorithms are well known for decoding run length encoded information representing the lengths of marks or spaces along the various horizontal rows of a PDF symbol. One such algorithm is described in the publication Uniform Symbology Specification PDF-417, published by AIM USA, the disclosure of which is incorporated by reference herein. The same operations are performed independently for data sets associated with the different real rasters 36, 56 and 58. In each case, the skew angles utilized represents the skew angle found for that particular real raster during the skew estimation step. As stated above, the skew estimation step will yield an erroneous value for one or two of the real rasters, and hence will yield virtual scan lines aligned with the vertical direction $Y_s$ of the symbol rather than the horizontal direction $X_s$ of the decoding operation for the data while by those rasters will yield unintelligible information. The typical decoding algorithms are arranged to provide an error signal if unintelligible information is obtained so that the unintelligible information is ignored. However, the decoding operation for at least one raster will succeed.

In a variant of the transformation methods discussed above, the system maps data from two adjacent real line segments onto each virtual scan line segment. Thus, the virtual scan line segment 112 has a left hand common crossing point 114 with real scan line segment 120 of real scanning line $28_N$. The virtual line segment 112 also has a right hand common crossing point 116 with a second real line segment 146 on the next real scanning line $28_{N+1}$. The system can map transition point 148 on this second real scanning line segment onto virtual scan line 112 to yield a further virtual transition point 150 on virtual line segment 112. In this operation, distance from right-hand common crossing point 116 to the real transition point 148 on real scan line $28_{N+1}$ is projected into distance from the right-hand crossing point 116 to the virtual transition point 150 on the virtual scan line. The same operations can be performed for all the virtual scanning line segments. In this dual mapping mode, each real transition point will map onto two virtual scan line segments. For example, real transition point 148 will also map onto a virtual transition point 152 on virtual scan line segment 154.

The system can suppress errors by comparing and combining the data mapped onto each virtual line segment from the two real line segments. In a perfect system, with a perfectly accurate skew angle $\psi$ and with no digitization or measurement errors, transition points associated with a vertical boundary 158 of the symbol, such as transition points 126 and 148 in FIG. 7, would map to exactly the same location on the virtual scan line segment. However, errors in the system will cause these real transition points to map as two virtual transition points 128 and 150 close to but not coincident with one another on a virtual scan line segment. The system can be arranged to treat any two virtual transition points mapped from different transition lines as representing a single real edge in the symbol if these two virtual transition points have horizontal or $X_v$ coordinates along the virtual scan line segment differing from one another by less than a preselected threshold. The system can be arranged to delete any such pair of points and substitute a single point for the pair of points. The coordinate $X_v$ of the single point may be the average of the virtual horizontal coordinates $X_{v7}$ of the two virtual transition points 128 and 150 in the pair. Alternatively, the system can be arranged to combine the data in other ways as, for example, by selecting the left most or right most member of each such pair and suppressing the other member.

Numerous variations and combinations of the features discussed above can be utilized without departing from the present invention as defined by the claims. For example, the transformation methods discussed above with reference to FIGS. 7 and 8 may be used with other skew detection algorithms. Conversely, the skew detection methods discussed above can be utilized by systems using other transformation methods. For example, the skew estimation can be used in a system which responds to the detected skew angle by generating a real raster pattern at the necessary orientation to match the horizontal direction of the symbol. As mentioned above, other forms of raster-based scanners can be employed to provide the data. Also, although it is preferred to perform the various steps of the method in real time, during a scanning operation, raster scan data can be stored and treated in accordance with the method at a later time.

As these and other variations and combinations of the features described above can be utilized without departing from the present invention, the foregoing description should be taken by way of illustration rather than by limitation of the invention as defined by the claims.

What is claimed is:

1. A method of acquiring and processing data defining an image of a symbol having vertical and horizontal directions and having one or more horizontal rows of dark and light regions denoting information encoded in the symbol, the method including the steps of:
    (a) acquiring raw scan data representing an image of a region including said symbol using a real raster having horizontal and vertical directions in a real raster frame of reference and having real scan lines extending in said horizontal direction;
    (b) run-length encoding said raw scan data so as to provide run-length encoded data including transition point data denoting the locations of transitions between light and dark on said real scan lines;
    (c) determining orientations of the directions of the symbol relative to the directions of the real raster and
    (d) using a transform based upon said orientations, transforming only the transition point data into a virtual scan frame of reference having virtual horizontal and vertical directions aligned with the horizontal and vertical directions of the symbol.

2. A method as claimed in claim 1 wherein said determining step is performed by examining data derived from said acquiring step.

3. A method as claimed in claim 2 wherein said determining step is performed by examining said run-length encoded data.

4. A method as claimed in claim 1 wherein said transforming step includes the step of mapping said transition data points onto virtual scan lines extending in the virtual horizontal direction.

5. A method of acquiring and processing data defining an image of a symbol having vertical and horizontal directions and having one or more horizontal rows of dark and light regions denoting information encoded in the symbol, the method including the steps of:
    (a) acquiring raw scan data representing an image of a region including said symbol using a real raster having horizontal and vertical directions in a real raster frame of reference and having real scan lines extending in said horizontal direction;
    (b) run-length encoding said raw scan data so as to provide run-length encoded data including transition point data denoting the locations of transitions between light and dark on said real scan lines;
    (c) determining orientations of the directions of the symbol relative to the directions of the real raster and
    (d) using a transform based upon said orientations, transforming only the transition point data into a virtual scan frame of reference having virtual horizontal and vertical directions aligned with the horizontal and vertical directions of the symbol, said transforming step including the step of mapping said transition data points onto virtual scan lines extending in the virtual horizontal direction;
    wherein said mapping step includes the steps of
    (1) finding crossing locations of said scanning lines of said real raster and said virtual scanning lines,
    (2) associating each said transition point with a crossing point adjacent to such transition point on the real scan line incorporating such transition point and with a virtual scan line incorporating the associated crossing point;
    (3) determining a distance between each said transition point and the associated crossing point along the real scan line incorporating such transition point and crossing point; and
    (4) for each transition point, transforming the distance along the real scan line obtained in said determining step to a distance along the associated virtual scan line and deriving transformed data denoting the location of the transition point on the associated virtual scan line at such distance from the associated crossing point.

6. A method as claimed in claim 5 wherein said associating step includes the step of segmenting said real scan lines to provide a plurality of segments, each such segment being encompassed between a first crossing point on the real scan line and the next adjacent crossing point on the same real scan line, and associating the transition points within each said segment with the first crossing point and with the virtual scan line extending through such first crossing point, said transforming step being performed so that the transformed data places each transition point within a segment of the associated virtual scan line between said first crossing point and the next adjacent crossing point on the associated virtual scan line.

7. A method of acquiring and processing data defining an image of a symbol having vertical and horizontal directions and having one or more horizontal rows of dark and light regions denoting information encoded in the symbol, the method including the steps of:
    (a) acquiring raw scan data representing an image of a region including said symbol using a real raster having horizontal and vertical directions in a real raster frame of reference and having real scan lines extending in said horizontal direction;
    (b) run-length encoding said raw scan data so as to provide run-length encoded data including transition point data denoting the locations of transitions between light and dark on said real scan lines;
    (c) determining orientations of the directions of the symbol relative to the directions of the real raster and
    (d) using a transform based upon said orientations, transforming only the transition point data into a virtual scan frame of reference having virtual horizontal and vertical directions aligned with the horizontal and vertical directions of the symbol, said transforming step including the step of mapping said transition data points onto virtual scan lines extending in the virtual horizontal direction;
    wherein said mapping step includes the steps of:
    (1) determining crossing points of said scanning lines of said real raster and said virtual scanning lines;

(2) segmenting said real and virtual scanning lines into a plurality of segments, each such segment extending between two crossing points on the scan line including such segment, each virtual scan line segment being associated with a first real scan line segment having a first common crossing point with that virtual scan line segment; and (3) mapping each transition point onto a virtual scan line segment from the first real scan line segment associated with such virtual scan line segment so that the distance between the common crossing point and each transition point in the virtual scan line segment is proportional to distance between the first common crossing point and the same transition point on the first real scan line segment.

8. A method as claimed in claim 7 wherein the first common crossing point for each real scan line segment and the associated virtual scan line segment lies at the same end of every real scan line segment and at the same end of every virtual scan line segment.

9. A method as claimed in claim 8 wherein each virtual scan line segment is also associated with a second real scan line segment having a second common crossing point with the virtual scan line segment, the method further comprising the step of mapping each transition point onto a virtual scan line segment from the second real scan line segment associated with such virtual scan line segment so that the distance between the second common crossing point and each transition point in the virtual scan line segment is proportional to distance between the second common crossing point and the same transition point on the second real scan line segment.

10. A method as claimed in claim 9 further comprising the step of comparing the locations of transition points on said virtual scan lines and detecting pairs of transition points having locations on the same virtual scan line differing from one another by less than a predetermined threshold, and replacing each said pair by a single transition point.

11. A method as claimed in claim 10 wherein said replacing step includes the step of averaging the locations of the transition points constituting the pair and locating the single transition point at a location on the virtual scan line equal to the averaged locations.

12. A method as claimed in claim 4 further comprising the step of deriving new run length encoded data representing run lengths along said virtual scan lines from said mapped transition points on said virtual scan lines.

13. A method as claimed in claim 1 or claim 4 wherein said symbol includes a plurality of horizontal rows of marks and spaces.

14. A method as claimed in claim 13 wherein said symbol is a PDF symbol.

15. A method as claimed in claim 13 further comprising the step of decoding each said line of marks and spaces based upon the mapped transition points on one said virtual scan line.

16. A method as claimed in claim 1 or claim 4 wherein said symbol includes one horizontal row of marks and spaces.

17. A method as claimed in claim 16 wherein said symbol is a bar code symbol.

18. A method as claimed in claim 1 wherein said runlength encoding, orientation-determining and transforming steps are performed substantially in real time during said acquiring step.

19. A method of processing data defining an image of a symbol having linear features in extending vertical and horizontal directions within the symbol, the method comprising the steps of:

(a) providing incoming image data representing a raster scan of said symbol having horizontal and vertical directions with scan lines in such horizontal direction, the directions of the raster being in an unknown orientation relative to the directions of the symbol;

(b) examining the incoming image data to select one or more linear features of the symbol extending at an angle of less than 45° to the horizontal direction of the raster and determining a skew angle between a direction of the symbol and a direction of the raster based upon the orientation of the selected linear feature.

20. A method as claimed in claim 19 further comprising the step of transforming said incoming image data based upon said skew angle to a virtual raster frame of reference having a horizontal direction aligned with the direction of the selected edge.

21. A method as claimed in claim 20 further comprising the step of repeating said steps using plural sets of incoming image data each representing a raster scan of said symbol at a different orientation, said examining and transforming steps being performed independently for each set of incoming image data.

22. A method as claimed in claim 21 wherein said plural sets of incoming image data include at least three sets of incoming image data representing rasters having horizontal directions oblique to one another, whereby at least one said set will have a horizontal direction oriented at an angle of less than 45° of the horizontal direction of the symbol.

23. A method as claimed in claim 19 wherein said examining and determining step includes the step of evaluating a function of location in the raster frame of reference and an assumed skew angle over a plurality of points represented by the incoming image data and over a plurality of assumed skew angles for each such point, said function having the property that points lying on a line will yield the same value of said function when the assumed skew angle is equal to an angle between such line and a direction of said raster frame of reference, said examining step including the step of counting the number of points which yield particular values of said function at each assumed skew angle, and selecting as the skew angle the assumed skew angle associated with the highest count.

24. A method as claimed in claim 23 wherein said function is a Hough transform ρ such that $$\rho = x \cos \theta + y \sin \theta$$

where:
   x is the coordinate of a point in the horizontal direction of the raster;
   y is the coordinate of the point in the vertical direction of the raster; and
   θ is the assumed skew angle.

25. A method as claimed in claim 23 wherein said examining step further includes the step of testing points in said incoming image data representing transitions in contrast to determine spacing between such points and excluding certain points from said evaluating step, said certain points in said incoming image data representing transitions in contrast less than a preselected filtering distance from other points in said incoming image data which represent transitions in contrast, whereby the step of excluding certain points from said evaluation step will exclude at least some points representing transitions in the interior of the symbol.

26. A method as claimed in claim 19 wherein said providing step includes the step of scanning a field including the symbol with a laser raster scanner.

27. A method as claimed in claim 20 wherein said scanning step is performed by use of a holographic scanner.

28. A method as claimed in claim 19 wherein said symbol includes a plurality of said horizontal rows of light and dark regions.

29. A method as claimed in claim 28 wherein said symbol is a PDF symbol.

30. A method of processing data defining an image of a rectangular symbol having edges extending in vertical and horizontal directions and having one or more horizontal rows of marks and spaces denoting information encoded in the symbol, the method comprising the steps of:

(a) providing incoming image data representing a raster scan of said symbol having horizontal and vertical directions with scan lines in such horizontal direction, the directions of the raster being in an unknown orientation relative to the directions of the symbol;

(b) examining the incoming image data to detect a horizontal feature of the symbol and determining the orientation of such horizontal feature relative to the frame of reference of the raster;

(c) determining a skew angle between a direction of the symbol and a direction of the raster based upon the orientation of the horizontal edge of the symbol; and (d) transforming said incoming image data based upon said skew angle to a virtual raster frame of reference having a horizontal direction aligned with the horizontal direction of the symbol.

31. A programming element for actuating a computer comprising a storage element and program information stored on said storage element, said program information being operative to actuate a computer to perform a method as claimed in claim 1 or claim 19.

32. A programmed electronic digital computer comprising a processor, a data memory and a program memory having program information stored therein, said program information being operative to actuate said computer to perform a method as claimed in claim 1 or claim 19.

* * * * *

UNITED STATES PATENT AND TRADEMARK OFFICE
CERTIFICATE OF CORRECTION

PATENT NO. : 6,490,376 B1
DATED : December 3, 2002
INVENTOR(S) : Ka Man Au and Zaioxun Zhu It is certified that error appears in the above-identified patent and that said Letters Patent is hereby corrected as shown below:

Title page,
Item [75], Inventors, "Zaioxun" should read -- Xaioxun --.

Column 1,
Line 17, "typically incorporate" should read -- typically incorporates --.

Column 2,
Line 47, "must be have" should read -- must have --.

Column 4,
Line 20, "limited of" should read -- limited amount of --.

Column 5,
Lines 15-16, "Moreover, because the" should read -- Moreover, the --.

Column 6,
Line 43, "which lie" should read -- while lies --.
Line 57, "at a different" should read -- at different --.

Column 7,
Line 10, "direction, of" should read -- direction of --.

Column 8,
Lines 27-28, "such a motor" should read -- such as a motor --.
Line 49, "line 28 raster" should read -- line 28 of raster --.
Line 62, "sequence of a ones" should read -- sequence of ones --.
Line 66, "arranged sweep" should read -- arranged to sweep --.

Column 9,
Line 38, "over the over the raster" should read -- over the raster --.

Column 13,
Line 7, "line the new" should read -- line as the new --.
Line 36, "although the line" should read -- of the line --.

UNITED STATES PATENT AND TRADEMARK OFFICE
CERTIFICATE OF CORRECTION

PATENT NO.    : 6,490,376 B1
DATED         : December 3, 2002
INVENTOR(S)   : Ka Man Au and Zaioxun Zhu It is certified that error appears in the above-identified patent and that said Letters Patent is hereby corrected as shown below:

Column 14,
Line 25, "is associated" should read -- are associated --.
Line 27, "segments shares a" should read -- segments share a --.
Line 29, "lowest the value" should read -- lowest value --.
Line 45, "crossing point the" should read -- crossing point of the --.
Line 54, "hand of end" should read -- hand end --.

Column 16,
Line 7, "utilized represents" should read -- utilized represent --.
Line 13, "while by those" should read -- while those --.

Signed and Sealed this

Twenty-second Day of July, 2003

JAMES E. ROGAN
*Director of the United States Patent and Trademark Office*